United States Patent
Durup et al.

[11] Patent Number: 5,892,148
[45] Date of Patent: Apr. 6, 1999

[54] METHOD OF LEAK TESTING AN UNDERGROUND FLUID-STORAGE CAVITY

[75] Inventors: Jean-Gérard Durup, Le Raincy; Benoît Guerber, Paris; Pierre Berest, Sceaux; Benoît Brouard, Paris; Jean Bergues, Leuville sur Orge, all of France

[73] Assignee: Gaz de France, France

[21] Appl. No.: 843,782

[22] Filed: Apr. 21, 1997

[51] Int. Cl.⁶ .............................. E21B 49/00; G01F 17/00
[52] U.S. Cl. ........................ 73/152.52; 73/149; 73/49.2; 405/53
[58] Field of Search .................................. 73/49.2, 40.7, 73/152.52, 152.01, 149, 152.31; 405/53

[56] References Cited

U.S. PATENT DOCUMENTS

| | | | |
|---|---|---|---|
| 4,455,869 | 6/1984 | Broussard et al. | 73/152.01 |
| 4,523,453 | 6/1985 | Faul et al. | 73/40.7 |
| 4,620,439 | 11/1986 | Faul et al. | 73/40.7 |
| 4,624,130 | 11/1986 | Faul et al. | |
| 4,720,995 | 1/1988 | Thiel | |
| 4,976,142 | 12/1990 | Perales | 73/152.52 |

Primary Examiner—Hezron Williams
Assistant Examiner—Jay L. Politzer
Attorney, Agent, or Firm—Ostrolenk, Faber, Gerb & Soffen, LLP

[57] ABSTRACT

The method comprising measuring the rate at which working fluid is expelled from a cavity through a central tubing to a well head under atmospheric pressure at the well head; determining the shape of a zone of the well selected for positioning an interface between a test fluid and the working fluid; performing temperature measurements and pressure measurements over the full height of a cavity under atmospheric pressure at the well head; injecting additional working fluid into the central tubing or into the annular space until a predetermined test pressure is reached; measuring the compressibility of a cavity during the preceding step; injecting test fluid into the annular; measuring the depth of the interface between the test fluid and the working fluid for a first time at the end of injecting test fluid; measuring the test fluid and the working fluid pressures at the well head; measuring the level of the interface between the test fluid and the working fluid for a second time; and evaluating the real leakage rate of test fluid that took place during said test period.

13 Claims, 4 Drawing Sheets

METHOD OF LEAK TESTING AN UNDERGROUND FLUID-STORAGE CAVITY

The present invention relates to a method of leak testing an underground fluid-storage cavity for storing fluids such as hydrocarbons, which cavity is connected to the surface by a well comprising: firstly central tubing that extends from the well head into the inside of the cavity and that serves for injecting and withdrawing a first working fluid; and secondly an annular space surrounding the central tubing, defined at its periphery by at least one cemented casing, and enabling a test fluid to be injected or withdrawn.

It is common practice to store hydrocarbons, such as natural gas, butane, or propane, and in particular in liquid form, in underground cavities, in particular saline cavities which have been formed by drilling and dissolving salt by means of a flow of fresh water. Storage cavities can be situated several hundred meters (m) beneath the ground surface. After the salt has been dissolved, there remains brine (salt-saturated water) in the saline cavity, which brine can be removed in part by means of the central tubing in the access well of the cavity. The fluid to be stored is injected into the annular space between the central tube and the concentric outer casing made up of a metal tube and various cemented lengths of casing. While the fluid to be stored is being injected under pressure, the brine is pushed back towards the bottom of the annular space and rises up the central tube.

For safety reasons, it is necessary periodically to monitor that the cavity is mechanically in good condition, and in particular it is necessary to monitor the borehole in order to verify that no significant leakage is taking place which would be damaging for the environment.

Various methods have been already proposed for testing the mechanical integrity of underground cavities, in particular in document U.S. Pat. No. 4,720,995. In those integrity-testing methods, a test fluid such as nitrogen is injected under pressure into the annular space in the well of a brine-containing cavity -to be tested. The nitrogen-brine interface in the annular space is then observed, and the way in which said interface moves over time is interpreted in terms of leakage. The section of the borehole is determined by calibration members. The interface may be located by means of a measurement tool lowered down the central tube. The pressure of the test fluid is generally about 10% higher than the maximum pressure of fluid stored at the depth of the interface while the cavity is in operation, for integrity testing performed before bringing the cavity into operation.

Nevertheless, known methods of testing cavities for mechanical integrity and based on interface measurements suffer from various drawbacks.

Thus, the brine-nitrogen interface can change position even when there is no gas leakage. The factors that can have an influence on the level of the interface include, amongst others, thermal expansion of the brine and the mechanical behavior of the mass of salt in which the cavity is formed. At the beginning of the lifetime of a cavity, it can lose considerable amounts of volume by flow, and this can also happen after a large change of pressure inside the cavity. Also, given that salt possess micropermeability for brine, a phenomenon can arise whereby brine percolates into the mass of salt.

It has also been observed that the method of testing mechanical integrity solely by observing the brine-nitrogen interface while taking account of the volume defined by the product of the section of the annular space of the well multiplied by the change in height at which said salt-nitrogen interface is situated can lead to leaks being underestimated by a factor of 50% to 100% due to a barometric effect.

The invention seeks to remedy the above-mentioned drawbacks and to make it possible simultaneously to improve the interpretation of methods for testing the mechanical integrity of underground fluid storage cavities by identifying and removing causes of error, and to leak test an underground cavity in a manner that is more convenient and faster, said method remaining compatible with preexisting methods and being capable of being combined therewith.

These objects are achieved by a method of leak testing an underground fluid-storage cavity, which cavity is connected to the surface by a well comprising: firstly central tubing which extends from the well head into the inside of the cavity and enables a first working fluid to be injected and withdrawn; and secondly an annular space surrounding the central tubing, defined at its periphery by at least one cemented casing, and enabling a test fluid to be injected or withdrawn; the method being characterized in that it comprises the following steps:

a) measuring the rate at which the working fluid is expelled at rest by the cavity through the central tube to the well head;

b) calibrating a zone of the well selected for positioning an interface between the test fluid and the working fluid;

c) performing temperature measurements and pressure measurements over the full height of the cavity at rest;

d) injecting additional working fluid into the central tubing or into the annular space until a predetermined test pressure is reached;

e) during above step d), measuring the compressibility of the cavity;

f) injecting test fluid into the annular space so as to bring the interface between the test fluid and the working fluid to a desired depth situated in said calibrated zone of the well;

g) measuring the depth of the interface between the test fluid and the working fluid for a first time at the end of injecting test fluid as performed in above step f);

h) during a determined test period, measuring the pressures of test fluid and of working fluid at the well head;

i) measuring the level of the interface between the test fluid and the working fluid for a second time at the end of the predetermined test period; and j) evaluating the real leakage rate of the test fluid during said test period on the basis of the measured depths of the interface between the test fluid and the working fluid, the section of the well, the computed densities of the test fluid and of the working fluid, the measured compressibility of the cavity, and the pressures measured at the well head.

Preferably, temperature measurements are also performed in steps g) and i) of measuring the depth of the interface between the test fluid and the working fluid.

The working fluid may be constituted by brine while the test fluid may be constituted by gaseous nitrogen.

For a test of integrity prior to being put Into operation, the test pressure is predetermined at about 10% greater than the maximum pressure of fluid stored while the cavity is in operation.

In a particular implementation, apparent compressibility is measured in step e) from the measured volume of working fluid injected in step d) and from the measured corresponding pressures of the working fluid at the well head.

Initially, the test method can be used to define reference conditions. Under such circumstances, a reference first leakage test is performed by selecting, for the positioning of the interface between the test fluid and the working fluid, a zone of the well that is situated in cemented casing. The test pressure is then selected so as to have the flow effect and the percolation effect in equilibrium, which phenomena should be known in advance when performing a reference test.

However, leak testing is performed at a test pressure that is about 10% higher than the maximum pressure during a period of operation by selecting, for the position of the interface between the test fluid and the working fluid, a zone of the well that is situated in a portion of the chimney above the storage cavity that is located beneath the cemented casing.

The method of the invention makes it possible to acquire more-complete knowledge about the characteristics of an underground cavity under reference conditions.

Under such circumstances, the method may comprise at least one additional step k) of artificial leak simulation by selectively injecting or withdrawing predetermined quantities of working fluid or of test fluid at the well head, a step l) of measuring the test fluid pressure and the working fluid pressure at the well head during each additional step k) of artificial leak simulation, and steps m), n) of measuring the level of the interface between the test fluid and the working fluid before and after each additional step k) of artificial leak simulation by selectively injecting or withdrawing predetermined quantities of working fluid or of test fluid.

Temperature measurements are also performed in steps m) and n) of measuring the level of the interface between the test fluid and the working fluid.

Other characteristics and advantages of the invention appear from the following description of particular implementations, given as examples, and with reference to the accompanying drawings, in which.

Figure 1:
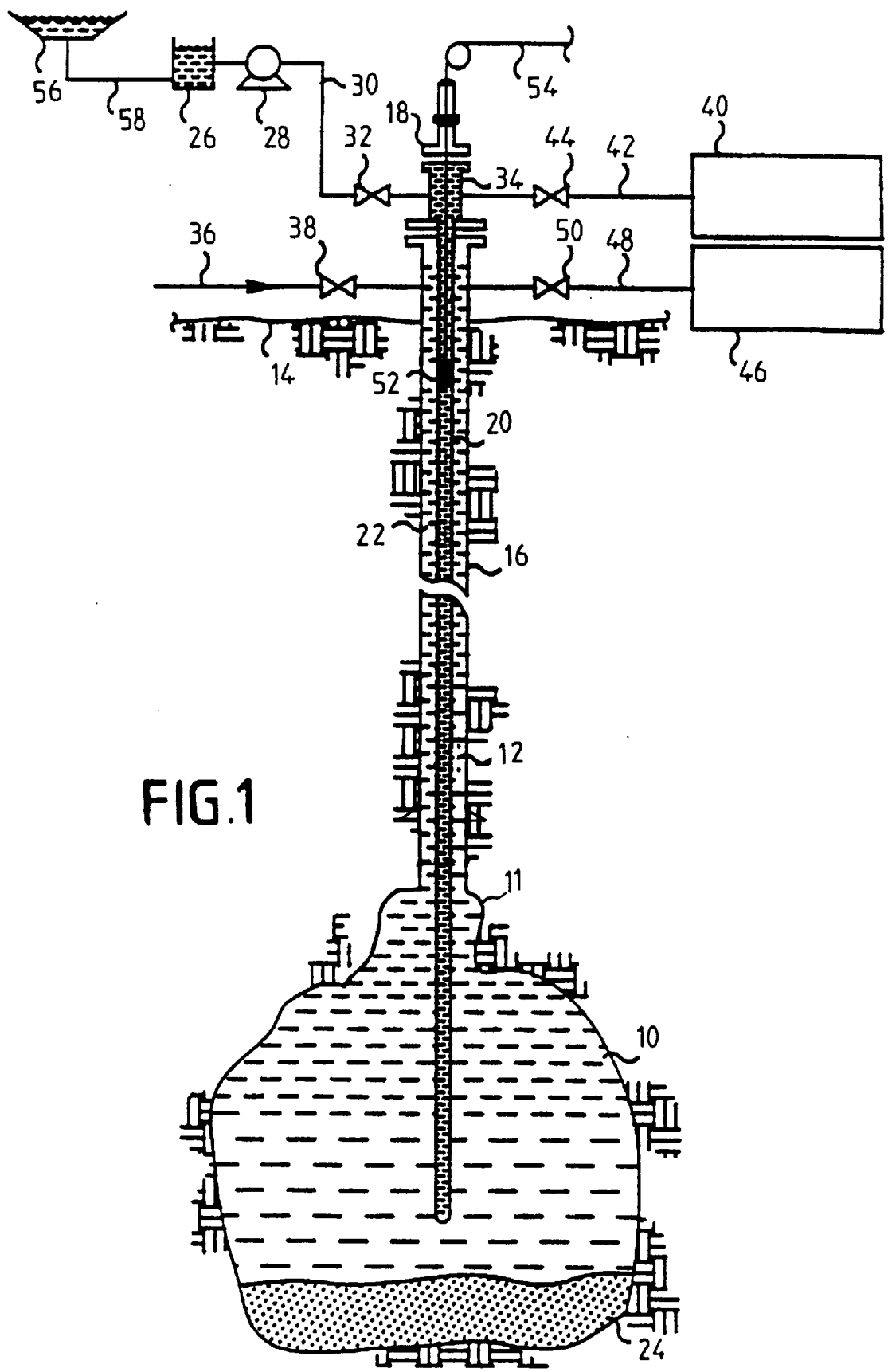
FIG. 1 is a diagrammatic vertical section view through an example of an underground cavity and a borehole to which the test method of the invention is applicable.

FIG. 1 shows an underground cavity 10 formed in a mass of salt and containing accumulated insoluble matter 24 collected in the bottom of the cavity 10. A borehole 12 is formed between the cavity 10 and the ground surface 14. Cemented casing 16 including an inner metal tube constitutes the inside lining of the borehole 12 and reaches down to the top portion 11 of the cavity 10. A central tube 20 is disposed in the borehole 12 running from the well head 18 into the core of the cavity 10. An annular space 22 is defined between the cemented casing 16 and the internal tube 20.

The space inside the central tube 20 communicates via a valve 32, a line 30, and a pump 28 with a weight or volume measuring tank 26 itself in communication via a line 58 with an external brine spillway 56. A source of test fluid, preferably a gas, e.g. an inert gas such as nitrogen, is in communication via a line 36 and a valve 38 with the annular space 22.

A pressure gauge 40 is connected by a line 42 and a valve 44 to the inside of the brine-filled central tube 20. Similarly, a pressure gauge 46 is connected via a line 48 and a valve 50 to the annular space 22.

A device 52 for detecting the interface between the test fluid (nitrogen) and the working fluid (brine) can be inserted on a cable 54 inside the central tube 20. This device 52 is of known type, e.g. a logging device, and is sensitive to variations in the position of the interface between the test fluid and the working fluid in the annular space 22.

Figure 2:
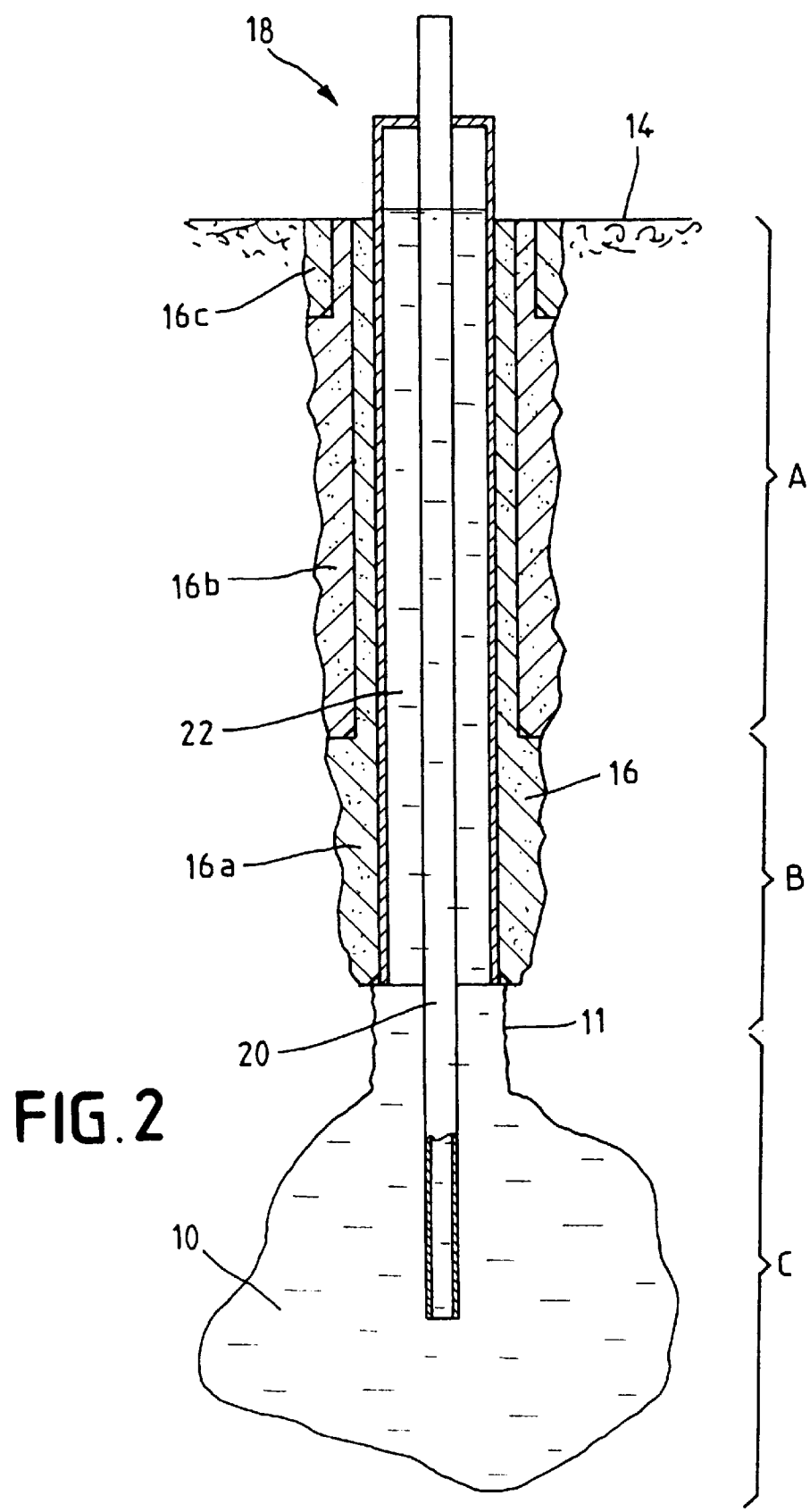
FIG. 2 is a simplified view analogous to FIG. 1 showing the various sections of a well and of an underground cavity to which the invention is applicable.

FIG. 2 shows cemented casing 16 made up of a plurality of layers of casing 16a, 16b, and 16c engaged one within another. Thus, the innermost casing 16a goes down from ground level 14 to the top of the chimney 11 which constitutes the top portion of the cavity 10. An intermediate casing layer 16b goes down from ground level 14 to a depth that is not as deep as the inner casing 16a. Outer casing 16c descends to a shallow depth from ground level around the inner and intermediate layers of casing 16a and 16b. The borehole and the cavity 10 thus define three main zones: a top zone A in which there exist a plurality of layers of cemented casing, and in which leakproofing is, in theory, good; an intermediate zone B that has only one layer of cemented casing 16a and that joins a top portion 11 of the chimney constituting the base or "shoe" of the cemented casing; and a bottom zone C constituted by the cavity proper 10.

It is the artificial portion of the underground cavity, and in particular the last layer of casing and its shoe that need to be subjected to leak testing.

The method of the invention serves to verify the validity of a traditional method of testing the mechanical integrity of an underground cavity by the method of determining the position of the interface between a working fluid such as brine initially filling the cavity and a test fluid such as nitrogen which is injected into the annular space 22.

The reference operating conditions are such that the gas-brine interface is well above the shoe of the last layer of cemented casing 16a, i.e. is in a zone where gas leakage is expected to be non-existent.

Also, reference operating conditions are selected such that the factors which cause the interface to move in the absence of any gas leakage are either absent or else well known.

For this purpose, testing is performed at a test pressure that is moderate. Such operating conditions should make it possible to obtain natural flow (i.e. brine which is expelled naturally through the well head) that compensates for the effect of brine percolation.

For a cavity that is old and well stabilized, in which the brine is very close to thermal equilibrium, thermal effects can be very small and, under the above operating conditions, it is possible to observe that the movements of the gas-brine interface due to thermal expansion are zero or very small.

Once it has been observed that operating conditions are stable, during this reference leak test, it is possible to proceed with tests in which calibrated artificial leaks are simulated by injecting or drawing off accurately measured quantities of brine or nitrogen at the well head, while simultaneously proceeding with conventional measurements of the level of the interface after each step of simulating artificial leaks by selectively injecting or withdrawing predetermined quantities of working fluid or of test fluid. Comparing the direct measurements of the quantities of fluid withdrawn or injected at the well head with the indirect measurements of said quantities using conventional measurements of the level of the interface before and after injection or withdrawal, makes it possible to evaluate the quality of the conventional interface measuring technique, and where appropriate, to validate it.

By continuously monitoring the pressures of the working fluid and of the test fluid at the well head by means of the measuring devices 40 and 46, it is also possible to establish correlation between the measurements performed by the interface technique and merely tracking variation of said fluid pressures.

When a series of tests for validating the conventional measurement technique have been performed and a series of correlations have been established while continuously monitoring nitrogen and brine pressures at the well head during leakage simulations, it is possible during another series of tests to define a zone in which the interface should be located in a portion of the well where real risks of leakage exist, e.g. beneath the shoe of the cemented casing 16a that extends deepest, since the metal casing at the top of the chimney may, for example, be suffering from corrosion.

Under such circumstances, the method of the invention makes it possible, merely by observing pressures at the well head, to detect a leak of gas and to distinguish it from other factors that could lead to a variation of interface level. In particular, the technique of observing pressures at the well head makes it possible to avoid underestimating leaks of test fluid due to failure to take proper account of the barometric effect.

It should be observed that it is possible from the pressures of brine and of test gas as measured at the well head to deduce all of the pressures in the fluid columns, whether inside the central tube 20 or in the annular space 22. The densities of the nitrogen and of the brine also vary little with pressure up the full height of a well that is several hundred meters deep, providing the effects of pressure and of temperature compensate each other. For example, over a depth of 500 meters, the nitrogen temperature varies by 5% (e.g. 12° C. at the surface and 27° C. at a depth of 500 m), while its pressure varies by 5.5%, such that the density of the nitrogen itself only varies by 0.5%.

Prior to each test, it may be necessary to pre-pressurize the cavity 10 by injecting a volume of saturated brine into the closed cavity via the central tube 20, or better via the annular space 22 thereby having the effect of increasing the pressure of the brine at the well head. Nevertheless, this pre-pressurization step is not essential when the test pressure is not very high and the cavity is small.

In the event of pre-pressurization, the apparent compressibility $\beta V$ of the cavity 10 can be determined by tracking the volumes of brine injected and the brine pressures at the well head. If no pre-pressurization is provided, compressibility can be determined during the stage of injecting brine for the purpose of reaching the test pressure, by simultaneously measuring the volumes of brine that are injected and the corresponding changes of pressure.

By way of example, a step of injecting brine in order to reach the test pressure can be performed progressively over one or two weeks. The injection of nitrogen into the annular space 22 can then be performed progressively, e.g. being spread out over three weeks, with brine periodically being bled off in order to keep the test pressure more or less constant. During this stage in which the gas-brine interface is lowered progressively into a desired zone, its position can be monitored on one or more occasions by means of the device 52, such as a logging tool.

For a recent storage cavity in which temperature stabilization after the operations of washing out the cavity is not complete, it is advantageous, prior to performing any testing and then at the end of testing, to measure temperatures over the full height of the cavity at rest. A knowledge of temperature distribution in the ground, from ground surface 14 down to the cavity 10, makes it possible to apply corrections, where necessary, for the purpose of taking into account various disturbances of thermal origin.

During the steps of injecting or withdrawing nitrogen and brine for the purpose of simulating leaks under reference conditions, it is appropriate in practice to be able to simulate leaks of the order of several liters per day which give rise to changes of gas pressure and of brine pressure at the well head of the order of $10^{-2}$ bars. Measurements can be performed, in practice, with precision of about $10^{-3}$ bars to $10^{-2}$ bars.

A process of injecting brine makes it possible, for example, to simulate thermal expansion. During such simulation, it is thus possible to inject 200 liters of brine, for example, over a period of several hours, thus giving rise, e.g. in a cavity having a volume of 8000 m$^3$ and with an interface at a depth of 400 meters to the interface changing position by about 1.6 m, and to pressure changing by about 0.5 bars.

A process of withdrawing brine makes it possible to simulate the effects of transient flow, of transient percolation, and of a transient return to saturation.

During simulation, it is thus possible to withdraw 200 liters of brine, for example, over a period of several hours, thus giving rise to changes in the depth of the interface or to changes in pressure of the same order as those above.

A process of withdrawing nitrogen corresponds to a leak. During a simulation, it is thus possible, for example, to withdraw 150 liters of nitrogen (17 kg) over a period of several days, for example.

Figure 3:
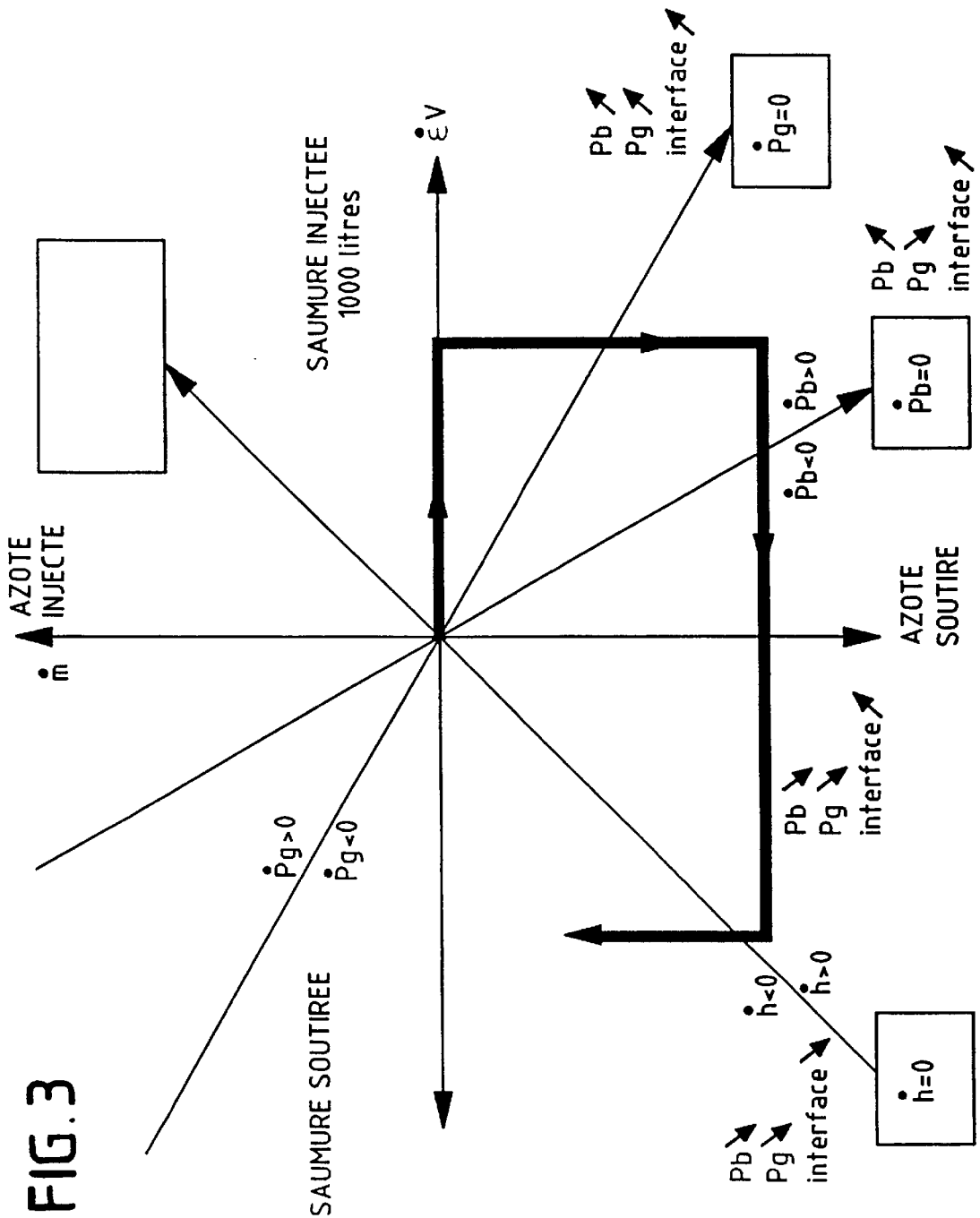
FIG. 3 is a diagram showing various ways in which parameters can vary as a function of the quantities of working fluid and of test fluid that are injected or withdrawn.

Let m be the mass of nitrogen in the annular space 12; $\dot{m}$ the rate of change of the mass m of nitrogen (in kg) relative to time; $\dot{\epsilon}V$ the change in volume of brine (in liters) injected or withdrawn per unit time; $\dot{P}g$ the variation in gas pressure (in bars) relative to time; $\dot{P}b$ the variation in brine pressure (in bars) relative to time; and $\dot{h}$ the variation (in meters) of the level of the gas-brine interface per unit time; with FIG. 3 being a diagram in which $\dot{\epsilon}v$ is plotted along the abscissa and $\dot{m}$ is plotted up the ordinate, with straight lines being shown for $\dot{h}=0$, $g=\dot{P}O$, and $\dot{P}b=0$.

The bottom portion of the diagram corresponding to $\dot{m}<0$ corresponds to simulating a nitrogen leak. When the magnitude $\dot{\epsilon}V$ is positive, i.e. when brine is injected (righthand side of the diagram), the effect of thermal expansion with a moderate leakage effect is simulated. When the magnitude $\dot{\epsilon}V$ is negative, i.e. when brine is withdrawn (lefthand portion of the diagram), the effects of large transients are simulated, such as expansion of the cavity during transient flow due to an increase in pressure, for example, with leaks remaining moderate in comparison. The bottom portion of the diagram, between the lines $\dot{h}=0$ and $\dot{P}b=0$, relates to simulating high rates of gas leakage which dominate any movement of brine for whatever reason.

Figure 4:
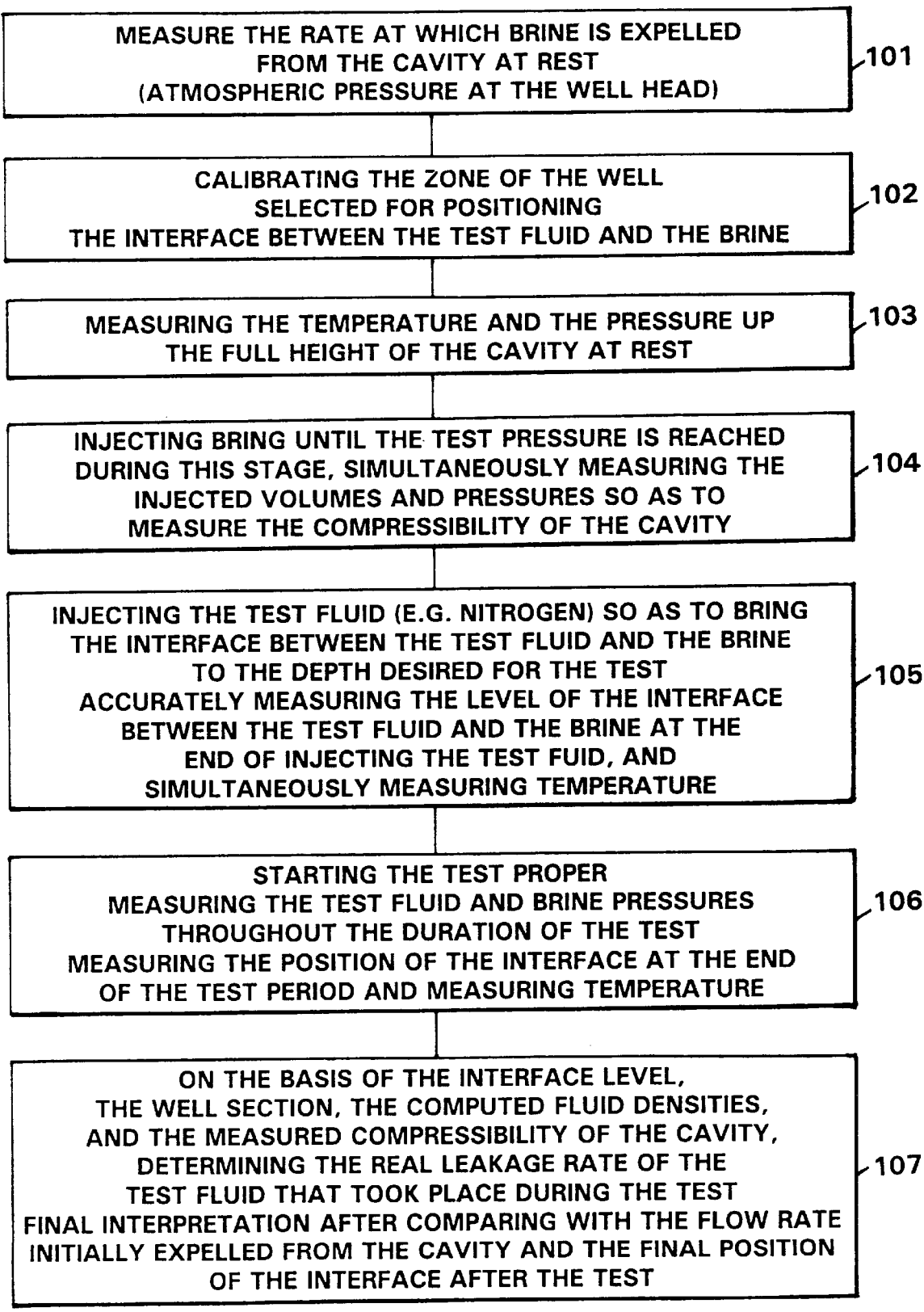
FIG. 4 is a flow chart showing the various steps of leak testing a saline cavity with brine, in accordance with the invention.

FIG. 4 is a flow chart showing the various steps of a method of leak testing a saline cavity containing brine.

During a first step 101, the rate at which brine is expelled from the cavity at rest is measured, i.e. with atmospheric pressure at the well head 18.

During a step 102, the zone of the well selected for positioning the interface between test fluid and brine is calibrated.

In step 103, temperatures are measured and pressure is measured over the full height of the cavity at rest.

In step 104, brine is injected via the central tube 20, or better via the annular space 22, until the predetermined test pressure has been reached (e.g. 35 bars).

During this step 104, simultaneous measurements are performed of the injected volumes and of the pressures so as to measure the apparent compressibility of the cavity.

In step 105, a test fluid such as nitrogen is injected into the annular space 22, and brine is withdrawn via the central tube 20 so as to bring the interface between the test fluid and the brine to the depth desired for the test, while maintaining the predetermined test pressure.

Steps 104 and 105 may occupy a period of three weeks, for example, in order to be sure that the cavity is properly stabilized. The quantities of fluid injected or withdrawn are measured accurately, as are changes of pressure at the well head. Pressure measurements are performed with a resolution of at least 1 kPa ($10^{-2}$ bars).

Once the interface between the fluids has reached the desired level, at the end of the process of injecting the test fluid, an accurate measurement is made of the interface between the test fluid and the brine, and temperature is measured.

In step 106, the test proper is begun. Test fluid pressure and brine pressure are measured throughout the duration of the test. At the end of the test, the position of the interface is measured and pressure is measured.

If the test proper is performed in a cavity that is stable and in a zone where the risk of leakage is practically zero, then pressure variation measurements are used to evaluate the influence of other factors that affect possible changes in the level of the interface.

If the test proper preformed in step 106 is not a reference test but takes place in a cavity where the risk of leakage is real, then, in step 107, the real leakage rate of the test fluid during the test is determined from the level of the interface, the section of the well, computed densities for the fluids, and the measured compressibility of the cavity.

Final interpretation is performed after comparing the flow rate initially expelled from the cavity and the final position of the interface at the end of the test.

In a variant, if a test is performed in a cavity that is stable, once step 105 has been performed, it is possible to perform a second accurate measurement of the interface between the test fluid and the brine a few days after performing the first measurement. If the interface is observed to be stable, it is then possible to proceed with leakage-simulating tests, or with tests relating to other phenomena that can affect the level of the interface, by injecting or withdrawing test fluid or brine.

Under such circumstances, by way of example, a simulation step replacing step 106 could include the following actions:

Injecting a given quantity (e.g. 200 liters) of brine into the cavity 10 via the central tube 20.

Measuring the change in the level of the interface and the fluid pressures at the well head.

Withdrawing a given quantity (e.g. 200 liters) of brine via the central tube 20.

Measuring the changes in the level of the interface and in the fluid pressures at the well head.

Injecting a given quantity (e.g. 10 kg) of nitrogen into the annular space 22.

Measuring the changes in the level of the interface and the fluid pressures at the well head.

Withdrawing a given quantity (e.g. 10 kg) of nitrogen via the annular space 22.

Measuring the changes in the level of the interface and in the fluid pressures at the well head.

Thereafter, all of the nitrogen is withdrawn via the annular space 22 so as to return the pressure at the well head 18 to zero.

As in step 101, the daily rate at which the cavity expels brine when at rest can again be measured, as can temperatures in the well.

The tests in which leaks are other phenomena of flow, percolation, and thermal expansion are simulated can be used as described above with reference to the diagram of FIG. 3.

We claim:

1. A method of leak testing an underground saline cavity for storing hydrocarbons, which cavity is connected to the surface by a well comprising firstly a central tubing which extends from the well head into the inside of the cavity and enables a first working fluid to be injected and withdrawn and secondly an annular space surrounding the central tubing, defined at its periphery by at least one cemented casing, and enabling a test fluid to be injected and withdrawn; the method being characterized in that it comprises the following steps:

a) measuring the rate at which the working fluid is expelled by the cavity through the central tubing to the well head under atmospheric pressure at the well head;

b) determining the shape of a zone of the well selected for positioning an interface between the test fluid and the working fluid;

c) performing temperature measurements and pressure measurements over the full height of the cavity under atmospheric pressure at the well head;

d) injecting additional working fluid into the central tubing or into the annular space until a predetermined test pressure is reached;

e) during above step d), measuring the compressibility of the cavity;

f) injecting test fluid into the annular space so as to bring the interface between the test fluid and the working fluid to a desired depth situated in said selected zone of the well;

g) measuring the depth of the interface between the test fluid and the working fluid for a first time at the end of injecting test fluid as performed in above step f);

h) during a determined test period, measuring the pressures of test fluid and of working fluid at the well head;

i) measuring the level of the interface between the test fluid and the working fluid for a second time at the end of the predetermined test period; and j) evaluating the real leakage rate of the test fluid during said test period on the basis of the measured depths of the interface between the test fluid and the working fluid, the section of the well, the computed densities of the test fluid and of the working fluid, the measured compressibility of the cavity, and the pressures measured at the well head.

2. A method according to claim 1, characterized in that temperature measurements are also performed in steps g) and i) of measuring the depth of the interface between the test fluid and the working fluid.

3. A method according to claim 1, characterized in that the working fluid is constituted by brine.

4. A method according to claim 1, characterized in that the test fluid is constituted by gaseous nitrogen.

5. A method according to claim 1, characterized in that apparent compressibility is measured in step e) from the measured volume of working fluid injected in step d) and from the measured corresponding pressures of the working fluid at the well head.

6. A method according to claim 1, characterized in that a first reference leak test is performed by selecting the position of the interface between the test fluid and the working fluid to be in a zone of the well that is situated within the cemented casing (16).

7. A method according to claim 6, characterized in that a second leak test is performed by selecting the position of the interface between the test fluid and the working fluid to be in a zone of the well situated in a portion of the chimney above the storage cavity (10) and below the cemented casing (16).

8. A method of leak testing an underground saline cavity for storing hydrocarbons, which cavity is connected to the surface by a well comprising firstly a central tubing which extends from the well head into the inside of the cavity and enables a first working fluid to be injected and withdrawn and secondly an annular space surrounding the central tubing, defined at its periphery by at least one cemented casing, and enabling a test fluid to be injected and withdrawn; the method being characterized in that it comprises the following steps:

a) measuring the rate at which the working fluid is expelled by the cavity through the central tubing to the well head under atmospheric pressure at the well head;

b) determining the shape of a zone of the well selected for positioning an interface between the test fluid and the working fluid;

c) performing temperature measurements and pressure measurements over the full height of the cavity under atmospheric pressure at the well head;

d) injecting additional working fluid into the central tubing or into the annular space until a predetermined test pressure is reached;

e) during above step d), measuring the compressibility of the cavity;

f) injecting test fluid into the annular space so as to bring the interface between the test fluid and the working fluid to a desired depth situated in said selected zone of the well;

g) measuring the depth of the interface between the test fluid and the working fluid for a first time at the end of injecting test fluid as performed in above step f);

h) during a determined test period, measuring the pressures of test fluid and of working fluid at the well head;

i) measuring the level of the interface between the test fluid and the working fluid for a second time at the end of the predetermined test period; and j) evaluating the real leakage rate of the test fluid during said test period on the basis of the measured depths of the interface between the test fluid and the working fluid, the section of the well, the computed densities of the test fluid and of the working fluid, the measured compressibility of the cavity, and the pressure measured at the well head, wherein the method further includes at least one additional step k) of artificial leak simulation by selectively injecting or withdrawing predetermined quantities of working fluid or of test fluid at the well head, a step l) of measuring the test fluid pressure and the working fluid pressure at the well head during each additional step k) of artificial leak simulation, and steps m), n) of measuring the level of the interface between the test fluid and the working fluid before and after each additional step k) of artificial leak simulation by selectively injecting or withdrawing predetermined quantities of working fluid or of test fluid.

9. A method according to claim 5, characterized in that temperature measurements are also performed in steps m) and n) of measuring the level of the interface between the test fluid and the working fluid.

10. A method according to claim 8, characterized in that temperature measurements are also performed in steps g) and i) of measuring the depth of the interface between the test fluid and the working fluid.

11. A method according to claim 8, characterized in that the working fluid is constituted by brine.

12. A method according to claim 8, characterized in that the test fluid is constituted by gaseous nitrogen.

13. A method according to claim 8, characterized in that apparent compressibility is measured in step e) from the measured volume of working fluid injected in step d) and from the measured corresponding pressures of the working fluid at the well head.

* * * * *